United States Patent [19]
Liu

[11] Patent Number: 5,650,569
[45] Date of Patent: Jul. 22, 1997

[54] SKEWED, MULTI-AXIS VIBRATION FIXTURE

[76] Inventor: Hong S. Liu, 284 Moraga Wayu, San Jose, Calif. 95119

[21] Appl. No.: 507,788

[22] Filed: Jul. 26, 1995

[51] Int. Cl.$^6$ ............................................. B06B 3/00
[52] U.S. Cl. ............................................. 73/663
[58] Field of Search ........................ 73/663, 662, 665, 73/666, 668, 597, 864.91

[56] References Cited

U.S. PATENT DOCUMENTS

| | | | |
|---|---|---|---|
| H338 | 10/1987 | Lipp | 73/663 |
| 3,686,927 | 8/1972 | Scharton | 73/665 |
| 3,712,120 | 1/1973 | Fletcher | 73/633 |
| 4,181,029 | 1/1980 | Talbot, Jr. | 73/665 |
| 4,633,716 | 1/1987 | Martin | 73/663 |
| 4,715,229 | 12/1987 | Butts | 73/663 |
| 5,156,051 | 10/1992 | Marshall | 73/663 |
| 5,277,066 | 1/1994 | Marshall | 73/663 |

FOREIGN PATENT DOCUMENTS

1174807 A 8/1985 U.S.S.R. ............ 73/663

*Primary Examiner*—Hezron E. Williams
*Assistant Examiner*—Christine K. Oda
*Attorney, Agent, or Firm*—Donald E. Schreiber

[57] ABSTRACT

A skewed, multi-axis vibration fixture supports a device as it undergoes vibration testing simultaneously along three mutually orthogonal axes. A base surface of the fixture is juxtaposed with and coupled to a vibrating surface which shakes along a pre-established vibration axis. A device mounting surface is rigidly coupled to the base surface in a pre-established fixed, skewed angular relationship. The device mounting surface receives and rigidly secures a device as it undergoes vibration testing. The device mounting surface secures the device at an invariable, skewed angle with respect to the vibration axis. Consequently, uniaxial shaking of the vibrating surface is coupled through the fixture to the device mounting surface and is decomposed into shaking along each of the device's three mutually orthogonal axes. The invariable, skewed angular relationship between the device and the vibration axis establishes fixed, pre-established ratios between the shaking along pairs of the device's mutually orthogonal axes. The planar device mounting surface is preferably formed as small as possible to match the shape of the device being tested. A light, rigid vibration fixture permits obtaining a more uniform vibration spectrum over a larger frequency range.

16 Claims, 5 Drawing Sheets

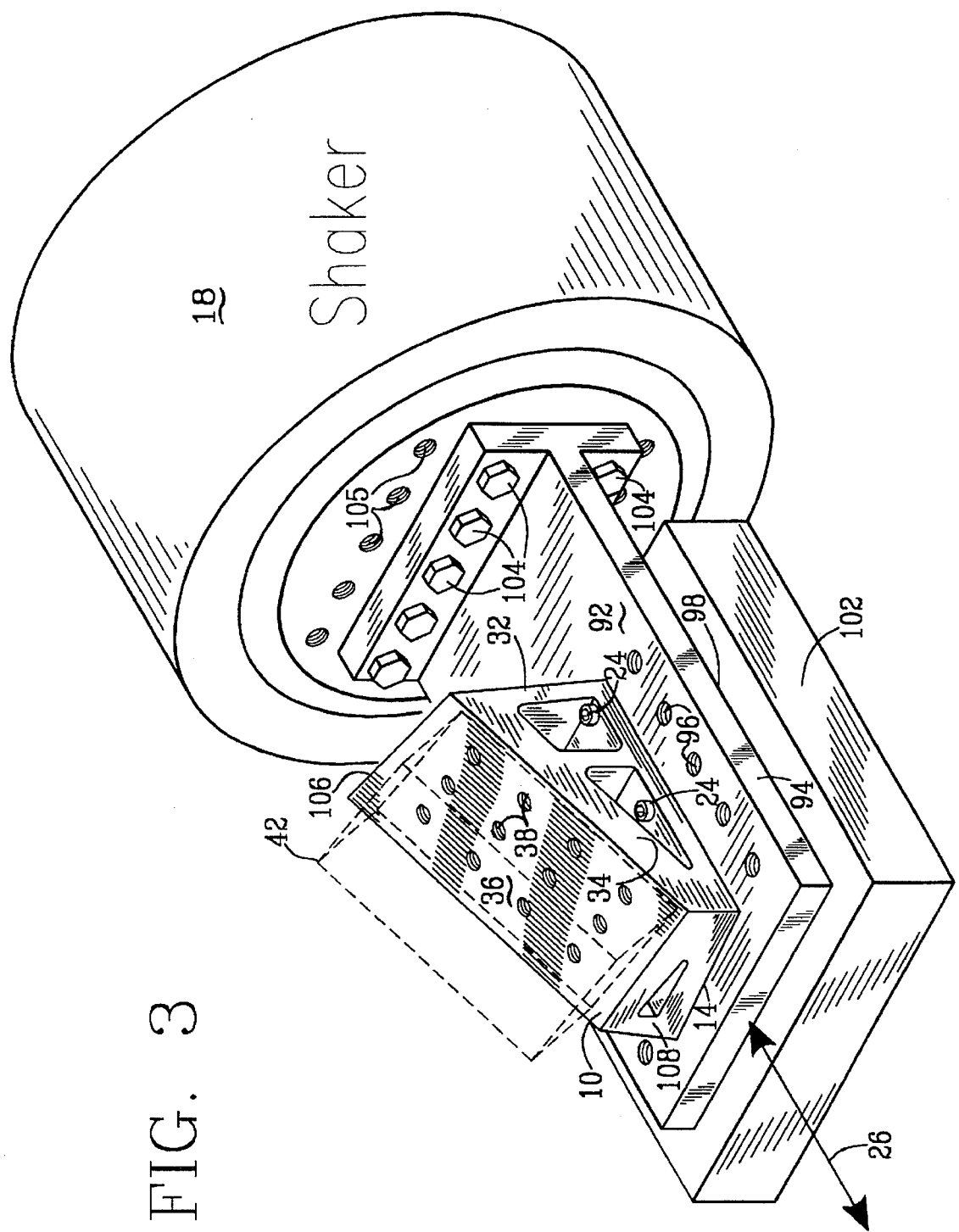

SKEWED, MULTI-AXIS VIBRATION FIXTURE

BACKGROUND OF THE INVENTION

1. Field of the Invention

The present invention relates generally to environmental testing and, more particularly, to fixtures used in vibration testing.

2. Description of the Prior Art

Manufacturers have observed that devices experience a high failure rate immediately after being placed in service, often referred to as "infant mortality," and as they near the end of their service life, often referred to as "old age." During a device's "mid-life" between infant mortality and old age, failure rates usually drop precipitously to a much lower value than those experienced during infant mortality and old age. Consequently, if before shipping a product a manufacturer can reliably and economically identify and eliminate those particular devices that will experience infant mortality, it can significantly improve the reliability of its products as perceived by customers, while also significantly reducing its warranty expenses. Studies of devices which experience infant mortality have shown that most such devices fail because of a latent defect introduced into the device during its manufacture. However, only after such a device experiences stress in its normal operating environment does the latent defect reveals itself by the device's failure.

Environmental stress screen ("ESS") is a manufacturing procedure applied to devices before they enter service which attempts to establish that they are free of defects. One technique employed in ESS involves securing the device to a vibration apparatus, e.g., a shaker, and then shaking the device while concurrently operating the device and recording its operation. Advanced ESS involves continuously monitoring a device's operation while exposing it both to broadband random vibration and to ultrahigh-rate temperature changes.

ESS testing is itself a process, and, like all manufacturing processes, must be controlled if it is to be applied repetitively and effectively to determine if a product is free of defects. Repetitively and reliably discovering hidden (latent) flaws or defects in materials, process, or design with ESS requires that a device be exposed to uniform high-acceleration vibration. If vibration equipment exhibits large variations, including variations as measured along each of a device's three mutually perpendicular axes, i.e. X, Y and Z axes, it is impossible to assert that the ESS process is both effective at identifying defective devices and does not damage devices being tested.

A shaker used in the ESS vibration process usually includes a table for mounting the device to be tested. That table is, in turn, coupled to a source of vibration, e.g. a pneumatically, electro-magnetically or hydraulically energized driver. Evaluation testing of equipment specifically configured for the ESS process has revealed inconsistencies and large variations in vibration levels across a single shaker table. This ESS equipment, which employs multiple independent vibration sources for simultaneously vibrating a device along each of three axes, exhibits vibration levels that vary greatly from point to point on the table. The vibration, measured in units of root mean square gravity ("gRMS"), varies by as much as 2.7 times from one location to another. Furthermore, the ratio of vibration between axes X/Z, Y/Z, and X/Y also varies greatly from location to location across the same vibration table. If this equipment were used for the ESS process, the fatigue damage imparted to a device tested at one location on the table could be up to 20,000 greater than the fatigue damage imparted to a device tested at another location on the table. Conversely, can it confidently be asserted that a device which receives 20,000 times less fatigue damage has been properly screened to determine if it is free from defects.

Finally, this ESS process equipment supplies most vibration energy at comparatively high frequencies, e.g. above 500 Hertz ("Hz"). It provides almost no vibration energy below 50 Hz. Effective ESS requires vibrating a device at low frequencies simultaneously along each of a device's three axes, i.e., X, Y and Z.

It has been suggested that the observed inconsistencies in the performance of this ESS vibration equipment and its large variations in vibration levels can be remedied by tuning the shaker table. Thus far, elimination of the observed inconsistencies by tuning the shaker table has not been demonstrated. Even if table tuning could eliminate the inconsistencies and large variations, the need for tuning itself poses a problem. Tuning a shaker table for a single device may be possible. However, tuning a table for simultaneously testing several devices at one time in a production environment is impractical. Such tuning would be labor intensive and require skilled technicians to tune and re-tune the shaker table for each successive set of devices.

Based upon the evaluation of presently available commercial equipment, there presently does not appear to exist equipment suitable for the ESS process that is capable of vibrating a device simultaneously along each of its three coordinate axes at uniform and repeatable acceleration at frequencies as low as 50 Hz.

U.S. Pat. No. 3,712,120 that issued Jan. 23, 1973, on an application filed on an invention by Clifton R. Simms and Richard C. Taylor ("the Simms et al. patent") discloses a multi-axis vibration fixture having, in one embodiment, an inclined mounting face to which is secured a rotatable specimen mounting fixture. Selecting an angle for the fixture's mounting face and skewing the mounting fixture about an axis perpendicular to the mounting face permits simultaneously vibrating a specimen along each of its three major orthogonal axes. Furthermore, rotation of the mounting fixture permits vibrating a specimen along other orthogonal axes which are not the specimen's major axes.

The vibration fixture disclosed in the Simms et al. patent is configured for proving a specimen's strength under extraordinary conditions. The vibration fixture was specifically set up to test items of various sizes and shapes. Thus this fixture provides a vibration apparatus with flexibility sufficient to meet most sizes and shapes of specimens to be tested. The Simms et al. patent discloses that it is desirable to have a vibration fixture which can be simply and quickly adapted for a wide variety of different items. Also, the vibration fixture disclosed in the Simms et al. patent was configured, through its rotatable mounting fixture, to minimize or avoid any structural modification in altering test conditions. Therefore, the multi-axis vibration fixture disclosed in the Simms et al. patent permits performing a wide variety of different strength tests with a minimum of effort.

While the vibration fixture disclosed in the Simms patent, and a similar fixture disclosed in U.S. Pat. No. 5,156,051that issued Oct. 20, 1992, on an application filed by Philip Marshall entitled "Vibration Test Fixture" ("the Marshall '051 patent"), are adaptable for testing specimens of various sizes and shapes, they are ill-suited for the ESS process. Performing ESS in a production environment requires mounting the same sized device over and over again onto the same vibration fixture. Furthermore, ESS is performed not to determine a device's strength, but rather to determine its freedom from defects. As explained previously, such production screening, if it is to be effective, requires repeatable and uniform vibration testing. Furthermore, it is awkward and expensive, if not impossible, to properly perform ESS using a physically massive, general purpose vibration fixture of the type disclosed both in the Simms et al. patent and in the Marshall '051.

SUMMARY OF THE INVENTION

An object of the present invention is to provide a multi-axis vibration fixture that facilitates effective environmental stress screening.

Yet another object of the present invention is to provide a smaller multi-axis vibration fixture.

Yet another object of the present invention is to provide a lighter multi-axis vibration fixture.

Yet another object of the present invention is to provide a more rigid multi-axis vibration fixture.

Yet another object of the present invention is to provide a multi-axis vibration fixture that permits testing a device with any arbitrarily selected energy versus frequency profile.

Yet another object of the present invention is to provide a multi-axis vibration fixture that can be properly and effectively utilized by lesser skilled individuals in performing the ESS process.

Briefly, the present invention is a skewed, multi-axis vibration fixture for supporting a device while the device undergoes vibration testing simultaneously along three mutually orthogonal axes. The multi-axis vibration fixture includes a base surface that is juxtaposed with and coupled to a vibrating surface. As is readily apparent to those skilled in the art, the vibrating surface may be a mounting surface of a shaker. Alternatively, the vibrating surface may be a plate resting on a slip table to which a shaker is coupled for shaking the plate. Thus secured to the vibrating surface, energizing the vibration apparatus causes the vibrating surface to shake along a pre-established vibration axis which correspondingly shakes the multi-axis vibration fixture.

A device mounting surface is rigidly coupled to the base surface in a pre-established fixed, skewed angular relationship. Consequently, shaking of the base surface is coupled to the device mounting surface. The planar device mounting surface receives and rigidly secures a device as it undergoes vibration testing. The planar device mounting surface secures the device at an invariable, skewed angle with respect to the vibration axis. The fixed, skewed angular relationship between the base surface and the device mounting surface establishes the invariable, skewed angle. Consequently, uniaxial shaking of the vibrating surface and of the base surface is coupled to the device mounting surface and is decomposed into shaking along each of the device's three mutually orthogonal axes. Because there exists an invariable, skewed angular relationship between the device and the vibration axis, ratios between the shaking along pairs of mutually orthogonal axes are pre-established by the fixed, skewed angular relationship between the base surface and the device mounting surface. Moreover, these ratios will not change in testing successive batches of a device.

To reduce as much as possible the weight of the multi-axis vibration fixture, its planar device mounting surface is preferably formed as small as possible to match, as well as practical, the shape of the device being tested. Making the multi-axis vibration fixture as small and as light as possible while maintaining its rigidity facilitates obtaining more uniform vibration spectrum over a larger frequency range. These characteristics of the multi-axis vibration fixture are also conducive to employing any arbitrary vibration energy versus frequency profile. While a multi-axis vibration fixture in accordance with the present invention for use in performing ESS on a particular product may result in fabrication of fixtures having various different overall shapes, in general the most common shape for the multi-axis vibration fixture is that of a truncated pyramid.

An advantage of the present invention is that, during ESS testing, devices receive the same relative vibration along each of their three mutually orthogonal axes even, if they are tested at widely different times. The fixed, skewed angular relationship between the base surface and the planar device mounting surface of the multi-axis vibration fixture establishes and preserves those ratios.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 3 is a perspective view of the skewed, multi-axis vibration fixture of FIG. 1 secured to a plate that rests upon a slip table and that is coupled to a shaker;

DETAILED DESCRIPTION OF THE PREFERRED EMBODIMENT

Figure 1:
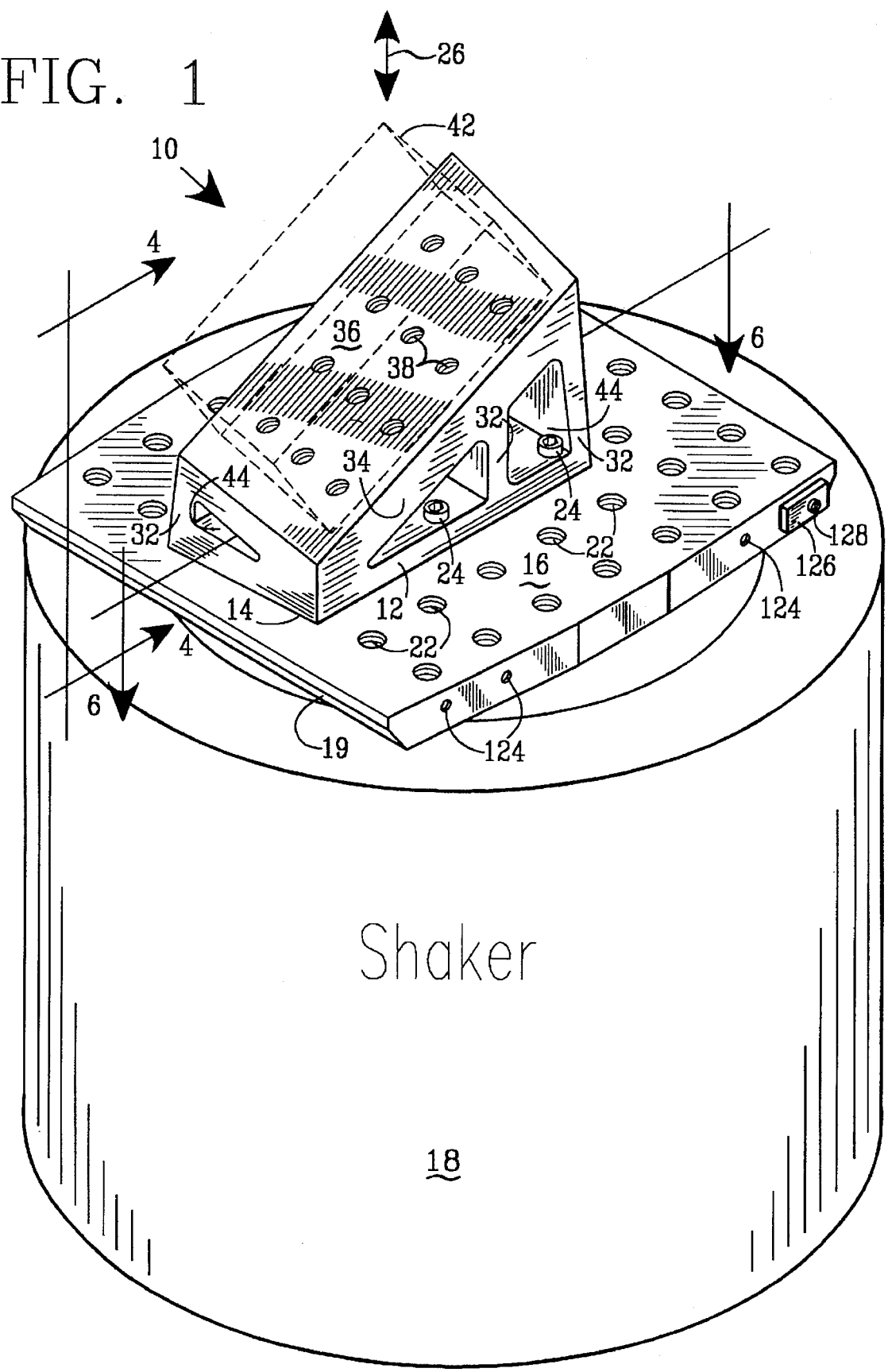
FIG. 1 is a perspective view of a skewed, multi-axis vibration fixture in accordance with the present invention secured to a vibrating mounting surface of a shaker head expander.

FIG. 1 depicts a skewed, multi-axis vibration fixture in accordance with the present invention identified by the general reference character 10. The vibration fixture 10 includes a base plate 12 having a substantially flat base surface 14 that is juxtaposed with a substantially flat mounting surface 16. While in principle the vibration fixture 10 may be secured directly to an armature of a shaker 18 (not depicted in any of the FIGS.), the vibration fixture 10 is preferably secured to a head expander plate 19 which, in turn, is secured to the armature. The mounting surface 16 of the head expander plate 19 includes a grid of threaded apertures 22 into which bolts 24 screw to secure the base plate 12 to the mounting surface 16. Upon energizing the shaker 18, the mounting surface 16 shakes up and down along a pre-established vibration axis 26, illustrated by a double headed arrow in FIG. 1. The mounting surface 16 and to the base surface 14 are disposed substantially perpendicular to the vibration axis 26.

The vibration fixture 10 includes a plurality of ribs 32 which project from the base plate 12 away from the base surface 14, and which join the base plate 12 to a device mounting plate 34. The ribs 32 are, in general, formed with a wedge-shaped cross-sectional shape having a non-uniform thickness. The device mounting plate 34 is formed with a planar device mounting surface 36 which is disposed furthest from the base plate 12. The base plate 12, the ribs 32 and the device mounting plate 34 ensure that shaking of the base surface 14 is coupled to the device mounting surface 36. A grid of threaded apertures 38 pierce the device mounting plate 34. The threaded apertures 38 adapt the vibration fixture 10 to receive threaded fasteners (not illustrated in FIG. 1) which secure a device 42 that is to undergo ESS (depicted with dashed lines) to the device mounting surface 36.

As depicted in FIG. 1, the device mounting plate 34 is disposed in a fixed, skewed angular relationship with respect to the base surface 14 and to the vibration axis 26 that, as described in greater detail below, is specified by two different angles. Because the device mounting plate 34 is disposed at a fixed, skewed angle with respect to the base surface 14, securing a device 42 to the device mounting surface 36 establishes an invariable, skewed angle between the device 42 and the vibration axis 26. Upon energizing the shaker 18, shaking along the vibration axis 26 perpendicular to the mounting surface 16 and to the base surface 14 is decomposed into shaking along each of three mutually orthogonal axes of the device 42. Disposing the device mounting surface 36 at a fixed skewed angular relationship with the base surface 14 pre-establishes reliably repeatable fixed ratios of vibration between pairs of mutually orthogonal axes of the device 42

To ensure maximum rigidity for the vibration fixture 10, the vibration fixture 10 is preferably monolithic having been machined from a single, solid piece of material, preferably either an aluminum or magnesium alloy. As illustrated in FIG. 1, the ribs 32 joining the base plate 12 with the device mounting plate 34 establish a plurality of apertures 44 within the vibration fixture thereby lightening it as much as possible without compromising its rigidity. Furthermore, in designing a particular vibration fixture 10, the use of finite element structural analysis is extremely beneficial in ensuring that the vibration fixture 10 is rigid; and in also assuring high resonant frequency for the vibration fixture 10 and maximizing vibration amplitude at any resonant frequencies. One detail of each vibration fixture 10 obtained by using finite element structural analysis is a specification for the precise location, cross-sectional-shape and thickness for the wedge-shaped ribs 32 which, in general, vary among different vibration fixtures constructed in accordance with the present invention. The use of ribs 32 having a wedge shape determined by finite element structural analysis increases the resonant frequency of the vibration fixture 10 while concurrently making the fixture more rigid and reducing the amplitude of fixture flexing.

Figure 2:
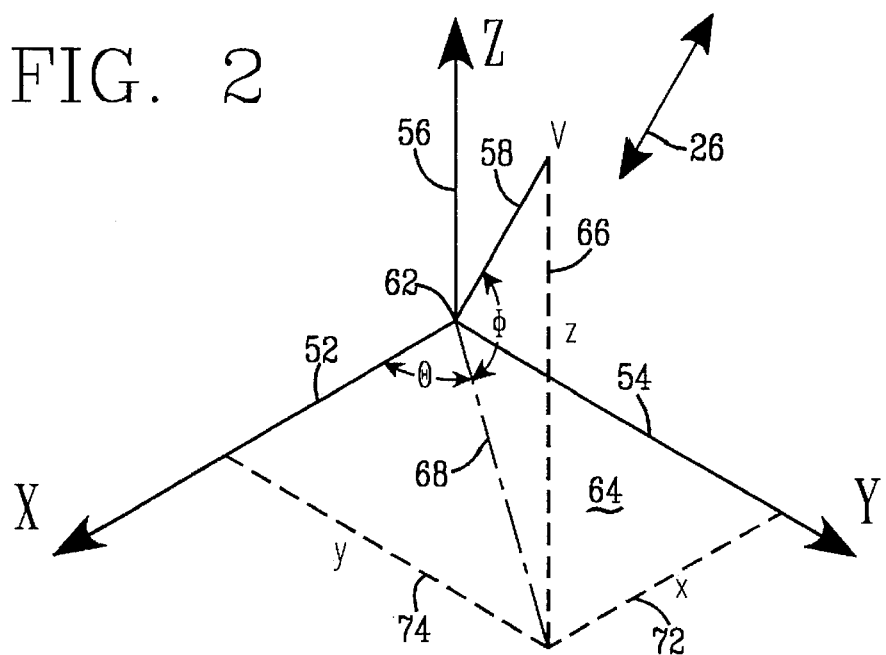
FIG. 2 is a diagram depicting the relationship between three mutually orthogonal axes of a device secured to a mounting surface of the multi-axis vibration fixture illustrated in FIG. 1 and a vibration axis of the shaker table.

FIG. 2 is a diagram which represents three mutually orthogonal axes, X, Y and Z of the device 42 respectively by arrows 52, 54 and 56. A vibration vector 58, identified by the letter "V," which is parallel to the vibration axis 26 projects from an origin 62 of the mutually orthogonal axes 52, 54 and 56. The vibration vector 58 intersects at an angle $\Phi$ a XY-plane 64, determined by the X-axis 52 and the Y-axis 54. A Z-component 66 ("z") of the vibration vector 58 along the Z-axis 56 equals the vibration vector 58 multiplied by the sine of the angle $\Phi$.

$$z = V \, SIN(\Phi)$$

A projection 68 ("$P_{XY}$") of the vibration vector 58 onto the XY-plane 64 equals the vibration vector 58 multiplied by the cosine of the angle $\Phi$.

$$P_{XY} = V \, CO/S(\Phi)$$

The XY-plane projection 68 intersects the X-axis 52 at the origin 62 at an angle $\Phi$. A X-component 72 ("x") of the vibration vector 58 along the X-axis 52 equals the XY-plane projection 68 multiplied by the cosine of the angle $\Phi$.

$$x = V \, COS(\Phi) \, COS(\theta)$$

A Y-component 74 ("y") of the vibration vector 58 along the Y-axis 54 equals the XY-plane projection 68 multiplied by the sine of the angle $\theta$.

$$y = V \, COS(\Phi) \, SIN(\theta)$$

To determine angles $\theta$ and $\Phi$ which pre-establish a particular fixed ratio of vibration between each of the pairs of the mutually orthogonal axes 52, 54 and 56, ratios $R_{XZ}$ and $R_{YZ}$ are first selected respectively for the vibration along the X-axis 52 with respect to the Z-axis 56, and along the Y-axis 54 with respect to the Z-axis 56. Selection of the such ratios $R_{XZ}$ and $R_{YZ}$ establishes the following equations.

$$R_{XZ} \, V \, SIN(\Phi) = V \, COS(\Phi) \, COS(\theta) \quad (1)$$

$$R_{YZ} \, V \, SIN(\Phi) = V \, COS(\Phi) \, SIN(\theta) \quad (2)$$

Dividing equation (2) by equation (1) yields the following equation.

$$\frac{R_{YZ} \, V \, SIN(\Phi)}{R_{XZ} \, V \, SIN(\Phi)} = \frac{V \, COS(\Phi) \, SIN(\theta)}{V \, COS(\Phi) \, COS(\theta)}$$

Simplifying the preceding equation yields the following equation.

$$TAN(\theta) = \frac{R_{YZ}}{R_{XZ}}$$

Solving the preceding equation for $\theta$ yields the following result.

$$\theta = TAN^{-1} \left( \frac{R_{YZ}}{R_{XZ}} \right) \quad (3)$$

Substituting equation (3) into equation (1) yields the following equation.

$$R_{XZ} V \operatorname{SIN}(\Phi) = V \operatorname{COS}(\Phi) \operatorname{COS}\left( \operatorname{TAN}^{-1}\left( \frac{R_{YZ}}{R_{XZ}} \right) \right)$$

Simplifying the preceding equation yields the following equation.

$$R_{XZ} \operatorname{TAN}(\Phi) = \operatorname{COS}\left( \operatorname{TAN}^{-1}\left( \frac{R_{YZ}}{R_{XZ}} \right) \right)$$

Solving the preceding equation for $\Phi$ yields the following result.

$$\Phi = \operatorname{TAN}^{-1}\left( \frac{\operatorname{COS}\left( \operatorname{TAN}^{-1}\left( \frac{R_{YZ}}{R_{XZ}} \right) \right)}{R_{XZ}} \right)$$

If, as will frequently be the case, $R_{XZ}$ equals $R_{YZ}$, then $$\Theta = \operatorname{TAN}^{-1}(1) = 45°, \text{ and}$$

$$\Phi = \operatorname{TAN}^{-1}\left( \frac{\operatorname{COS}(45°)}{R_{XZ}} \right) = \operatorname{TAN}^{-1}\left( \frac{0.707}{R_{XZ}} \right).$$

Having determined values for the angles $\Phi$ and $\Theta$ using the equations set forth above which will produce the desired ratios $R_{XZ}$ and $R_{YZ}$, one method for determining the shape of the desired vibration fixture 10 is to use a computer aided design ("CAD") system to rotate an initially horizontal plane through the computed angles $\Phi$ and $\Theta$. Alternatively, angles $\alpha$ and $\beta$ between the base surface 14 and lines lying in the device mounting surface 36, illustrated in FIG. 5, may be computed as follows.

In accordance with the relationships determined previously for the x, y and z components of the vibration vector V, the vector V may be specified using these components as follows.

$$V = (V \cos\Phi \cos\Theta, V \cos\Phi \sin\Theta, \sin\Phi)$$

Figure 5:
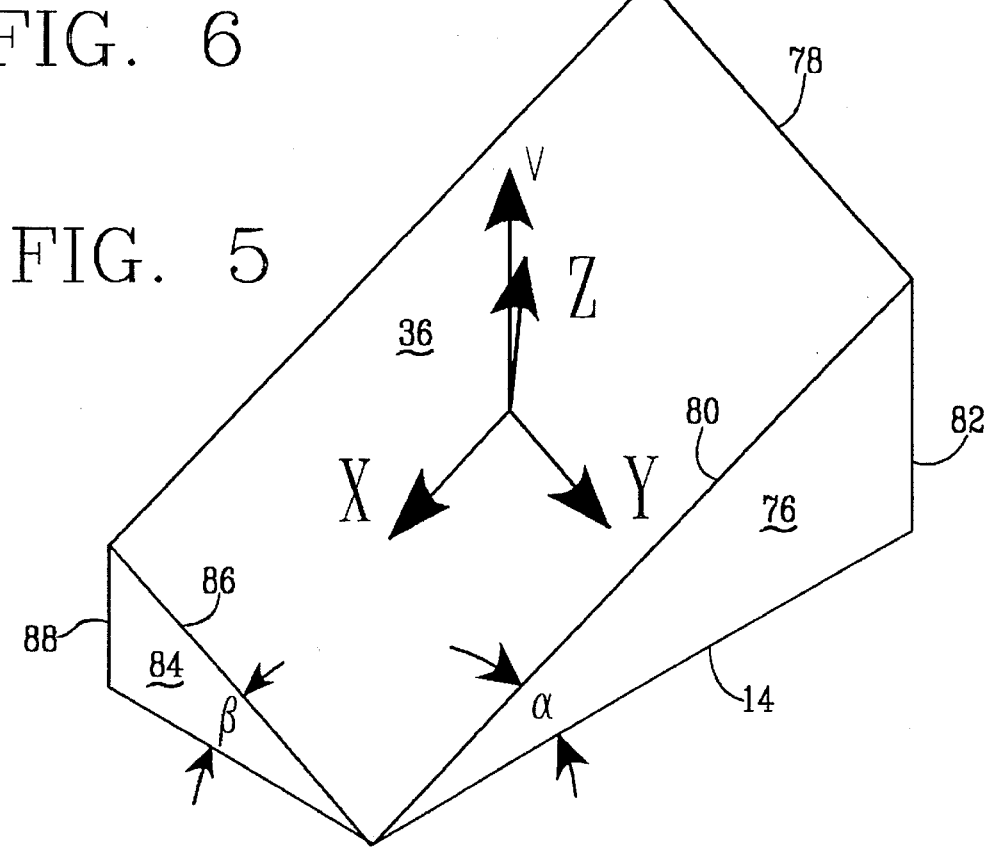
FIG. 5 is a perspective view of a pyramidal solid that assists in determining angles useful in fabricating the skewed, multi-axis vibration fixture depicted in FIGS. 1, 3 and 4.

Now, consider a right-triangular face 76 of a pyramidal solid 78, illustrated in FIG. 5, which has one side 80 that lies in the device mounting surface 36 and is parallel to the X-axis of the device 42. Another side 82 of the right-triangular face 76, that is opposite the angle $\alpha$, is parallel to the vector V. The following equation sets forth the vector dot-product of the vector V with a unit vector $\vec{e}_x$ directed along the side 80.

$$V \cdot \vec{e}_x = V \cos(90° - \alpha) = V \cos\Phi \cos\Theta$$

Therefore, eliminating the scalar V from the preceding equation and solving for $\alpha$ one obtains the following relationship.

$$\alpha = 90° - \cos^{-1}(\cos\Phi \cos\Theta)$$

Analogously, to evaluate the angle $\beta$ in FIG. 5, consider a right-triangular face 84 of the pyramidal solid 78 which has one side 86 that lies in the device mounting surface 36 and is parallel to the Y-axis of the device 42. Another side 88 of the right-triangular face 84, that is opposite the angle $\beta$, is parallel to the vector V. The following equation sets forth the vector dot-product of the vector V with a unit vector $\vec{e}_y$ directed along the side 86.

$$V \cdot \vec{e}_y = V \cos(90° - \beta) = V \cos\Phi \sin\Theta$$

As before, eliminating the scalar V from the preceding equation and solving for $\beta$ one obtains the following relationship.

$$\beta = 90° - \cos^{-1}(\cos\Phi \sin\Theta)$$

FIG. 3 depicts the vibration fixture 10 secured to an upper surface 92 of a T-shaped plate 94. The plate 94 includes a grid of threaded apertures 96 into which bolts 24 screw to secure the base plate 12 to the plate 94. The plate 94 has a lower surface 98 which is parallel to the upper surface 92 and which rests upon a slip table 102. One end of the T-shaped plate 94 is secured to the armature of the shaker 18 by bolts 104 that screw into threaded apertures 105. As is apparent to those skilled in the art of vibration testing, the use of the vibration fixture 10 in conjunction with the plate 94 and the lower surface 98 is particularly advantageous for environmentally testing a heavy device 42.

Note that the vibration fixture 10 as secured to the plate 94 in the illustration of FIG. 3 may apply different ratios of vibration along each of the three mutually orthogonal axes 52, 54 and 56 of the device 42 than the vibration fixture 10 applies in the illustration of FIG. 1. It is likely that the vibration ratios differ between the mountings depicted in the two FIGS. because in FIG. 1 the vibration axis 26 is perpendicular to the base surface 14 whereas in FIG. 3 the vibration axis 26 is parallel to the base Surface 14. However the same vibration ratios may be obtained both in FIG. 1 and in FIG. 3 if in FIG. 3 the base surface 14 were disposed perpendicular to the vibration axis 26 with a larger end surface 106 of the vibration fixture 10 juxtaposed with the upper surface 92 while a smaller end surface 108 of the vibration fixture 10 projects upward away from the upper surface 92.

Figure 4:
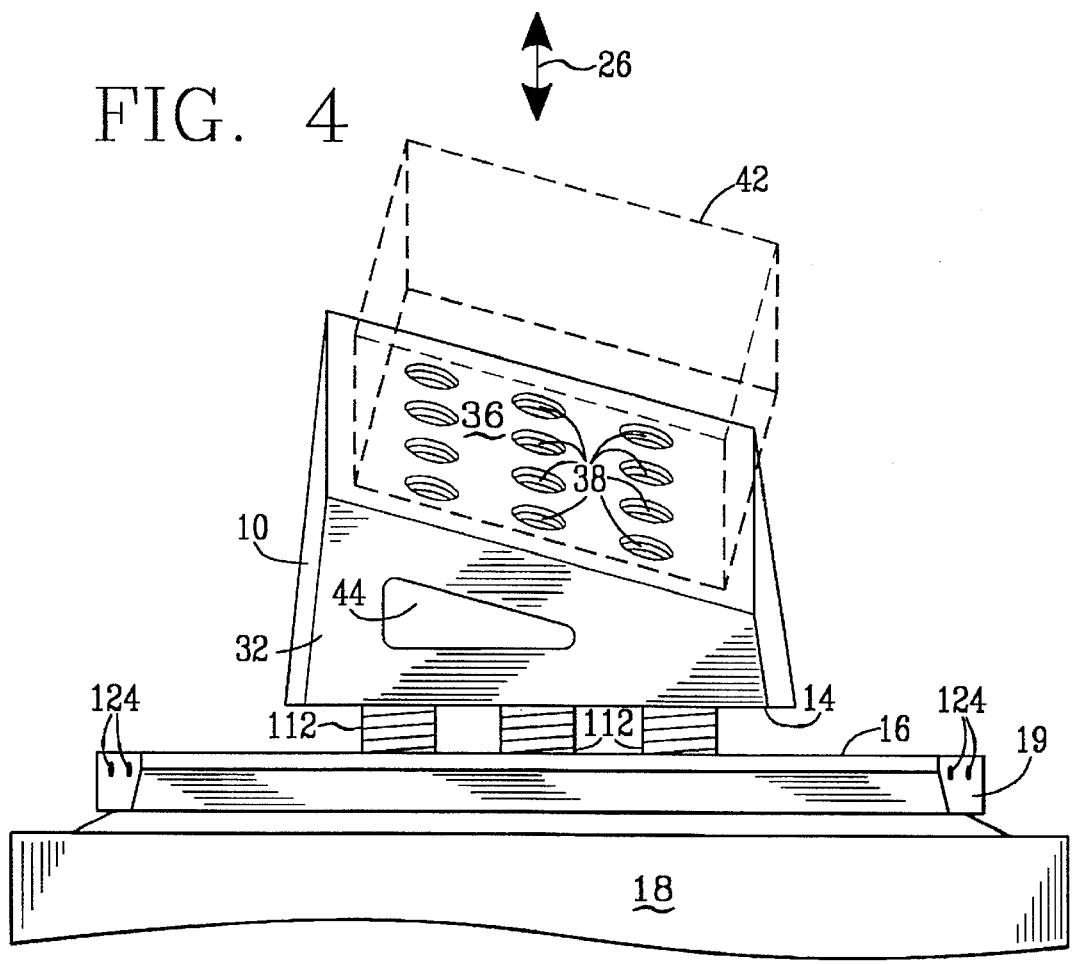
FIG. 4 is a elevational view of the skewed, multi-axis vibration fixture taken along the line 4—4 of FIG. 1 illustrating resilient mounting of the vibration fixture on the vibrating mounting surface.

While the vibration fixture 10 as disclosed thus far provides reliably repeatable ratios of translation vibration between pairs of mutually orthogonal axes 52, 54 and 56 of the device 42, it appears likely that the reliability and repeatability of ESS may be further enhanced by also simultaneously randomly rotating the device 42 about each of those axes. As illustrated in FIG. 4, such rotary vibration about the mutually orthogonal axes 52, 54 and 56 may be obtained by securing the vibration fixture 10 to the mounting surface 16, or to the upper surface 92 of the plate 94, by with a resilient coupling such as a grid of springs 112 or of stacks of washers. Equivalently, the device 42 may be secured to the device mounting surface 36 of the vibration fixture 10 by a resilient coupling. Using either of the two preceding mounting arrangements, because the device mounting plate 34 is disposed at a fixed, skewed angle both with respect to the base surface 14 and to the vibration axis 26 and if the center of mass of the combined vibration fixture 10 and device 42 is offset with respect to the grid of springs 112, as the mounting surface 16 shakes along the vibration axis 26, the device 42, in addition to shaking along each of its mutually orthogonal axes 52, 54 and 56, also rotates about each of those axes.

Figure 6:
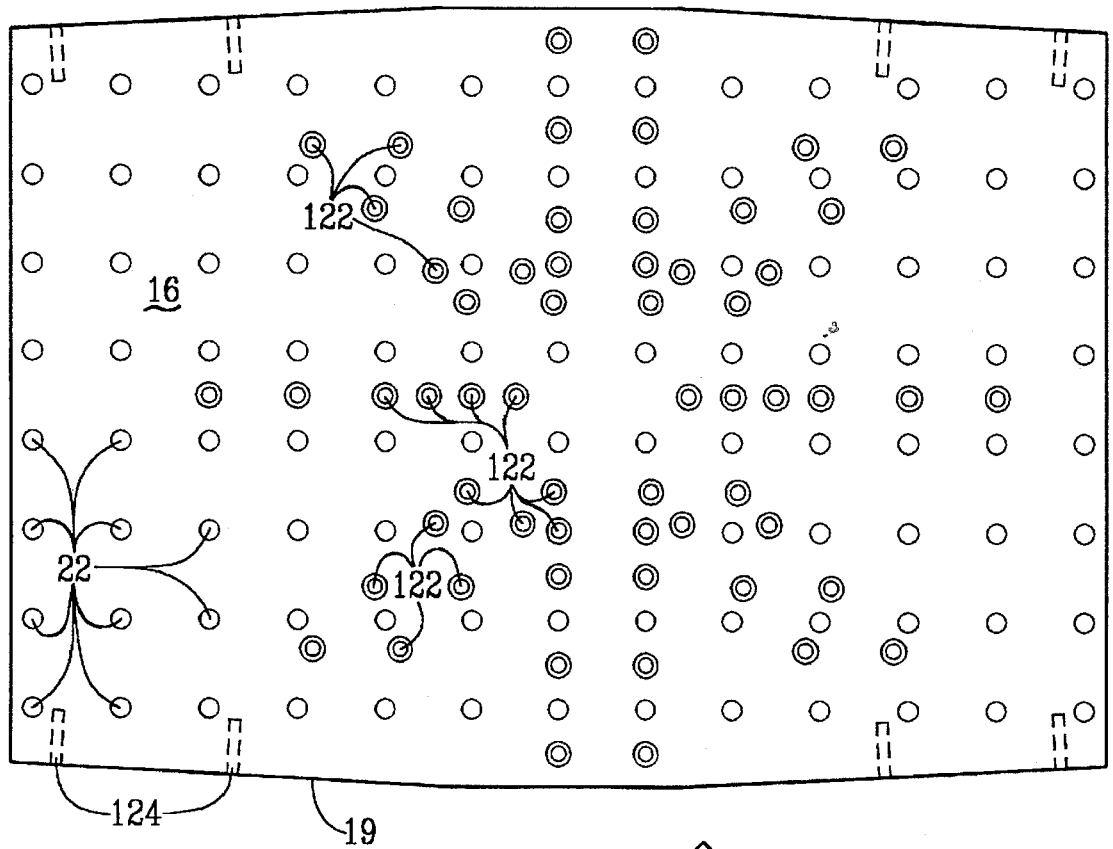
FIG. 6 is a plan view of a preferred embodiment for the head expander depicted in FIGS. 1 and 4.

Referring now to FIG. 6, depicted there is a plan view of the mounting surface 16 of a preferred embodiment of the head expander plate 19. The head expander plate 19 includes a regularly-spaced, rectangularly-shaped grid of threaded apertures 22. The threaded apertures 22 are used for securing vibration fixtures to the head expander plate 19. Immediately adjacent pairs of threaded apertures 22 are spaced apart along each of the grid's primary axes by a uniform separation distance such as 2.0 inches.

Intermeshed within the grid of the threaded apertures 22 and located centrally within the mounting surface 16 of the head expander plate 19 are two identical, radially-arranged arrays of smooth, counter-bored apertures 122 that, as depicted in FIG. 5, are uniformly spaced along circumferences of two nested sets of concentric circles. The radially-arranged arrays of counter-bored apertures 122 are positioned to match mating threaded apertures that are present in an armature of the shaker 18 such as the threaded apertures 105 depicted in FIG. 3. One of the radially-arranged arrays of the counter-bored apertures 122 is symmetrically disposed about the middle of the head expander plate 19. This centrally located array is used primarily with conventional vibration fixtures used in shaking a device 42 along a single one of its coordinate axes. The second radially-arranged array of the counter-bored apertures 122 is offset toward a side of the head expander plate 19 from the centrally located array. This offset array of counter-bored apertures 122 is preferably used for securing the head expander plate 19 to the armature of the shaker 18 when the vibration fixture 10 of the present invention is secured to the head expander plate 19.

The offset radially-arranged array of counter-bored apertures 122 is preferably used with the vibration fixture 10 so the center of mass of the combined head expander plate 19, vibration fixture 10, and device 42 may be positioned directly over the center of the armature of the shaker 18. Arranged in this manner, even though the device 42 shakes along each of its three mutually orthogonal axes 52, 54 and 56, the mass of the combined head expander plate 19, vibration fixture 10, and device 42 exerts no net torque on the armature of the shaker 18. To facilitate positioning the center of mass of the combined head expander plate 19, vibration fixture 10, and device 42 directly over the center of the armature of the shaker 18, as best illustrated in FIG. 1 the head expander plate 19 includes threaded apertures 124 located along its side surfaces to which weights 126 may be secured by screws 128.

Figure 7:
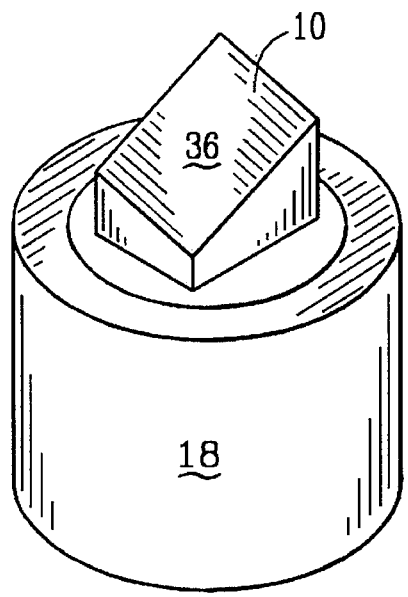
FIG. 7 is a perspective view illustrating an alternative embodiment of the skewed, multi-axis vibration fixture of FIG. 1 having an outer surface formed in the shape of a truncated prism.
Figure 8:
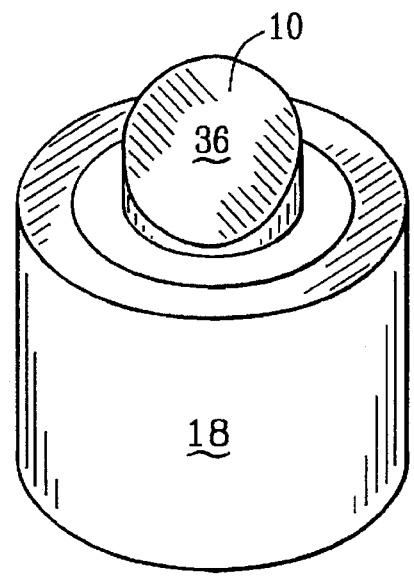
FIG. 8 is a perspective view illustrating an alternative embodiment of the skewed, multi-axis vibration fixture of FIG. 1 having an outer surface formed in the shape of a truncated cylinder.
Figure 9:
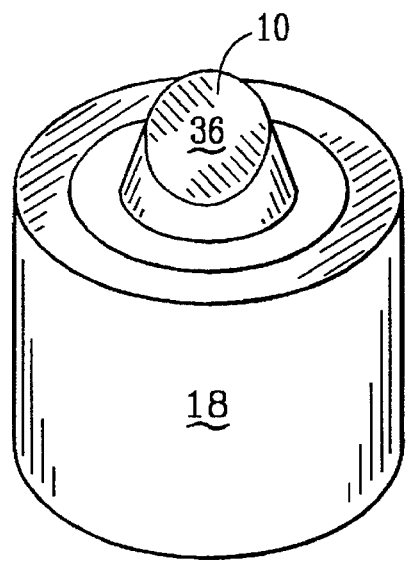
FIG. 9 is a perspective view illustrating an alternative embodiment of the skewed, multi-axis vibration fixture of FIG. 1 having an outer surface formed in the shape of a truncated cone.

Although the present invention has been described in terms of the presently preferred embodiment, it is to be understood that such disclosure is purely illustrative and is not to be interpreted as limiting. For example, considering only outer surfaces of the vibration fixture 10 as a geometrical solid and ignoring the apertures 44, the vibration fixture 10 depicted in FIG. 1 preferably constitutes a truncated pyramid of which the base surface 14 and the device mounting surface 36 form respectively a base and an upper surface. To increase the rigidity of the vibration fixture 10 while concurrently minimizing resonances and flexing of the vibration fixture 10, a pyramidally-shaped vibration fixture 10 is preferably formed with the base plate 12 having a larger area than the device mounting plate 34. Although the preferred embodiment of the vibration fixture 10 disclosed herein is formed in the shape of a truncated pyramid, depending upon the shape and characteristics of the device 42 which is to undergo ESS, a vibration fixture 10 in accordance with the present invention may be formed in the shape of a truncated prism illustrated in FIG. 7. Analogously, for a circularly-shaped device 42, a vibration fixture 10 in accordance with the present invention may be formed in the shape of a truncated cylinder illustrated in FIG. 8 in the shape of a truncated cone illustrated in FIG. 9. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A multi-axis, skewed vibration fixture for supporting a device to be vibrated in which the device shakes simultaneously along three mutually orthogonal axes, shaking of the device ultimately being effected by a vibrating surface that shakes along a pre-established vibration axis, the multi-axis vibration fixture comprising:

a base surface adapted to be juxtaposed with and coupled to the vibrating surface so shaking of the vibrating surface shakes the multi-axis vibration fixture; and a single planar device mounting surface that is rigidly coupled to said base surface so shaking of said base surface is coupled to said device mounting surface, said device mounting surface being disposed to established a fixed, skewed angular relationship with both said base surface and with the vibration axis, said planar device mounting surface being adapted for receiving and rigidly securing the device to be vibrated at an invariable, skewed angle with respect to the vibration axis, the skewed angle being pre-established by the fixed, skewed angular relationship between said base surface and said device mounting surface so that uniaxial shaking of the vibrating surface and of said base surface coupled to said single planar device mounting surface is decomposed into shaking along each of the three mutually orthogonal axes of the device with ratios between shaking along pairs of the mutually orthogonal axes being:

a. pre-established by the fixed, skewed angular relationship between the device mounting surface and the vibration axis; and b. unequal.

2. The multi-axis vibration fixture of claim 1 wherein said base surface and said device mounting surface form respectively a base and upper surface of a multi-axis vibration fixture having a shape of a truncated pyramid.

3. The multi-axis vibration fixture of claim 1 wherein said base surface and said device mounting surface form respectively a base and upper surface of a multi-axis vibration fixture having a shape of a truncated prism.

4. The multi-axis vibration fixture of claim 1 wherein said base surface and said device mounting surface form respectively a base and upper surface of a multi-axis vibration fixture having a shape of a truncated cylinder.

5. The multi-axis vibration fixture of claim 1 wherein said base surface and said device mounting surface form respectively a base and upper surface of a multi-axis vibration fixture having a shape of a truncated cone.

6. The multi-axis vibration fixture of claim 1 wherein the vibrating surface and said base surface are both substantially flat and disposed substantially perpendicular to the vibration axis.

7. The multi-axis vibration fixture of claim 1 further comprising a head expander plate wherein the vibrating surface is a surface of the head expander plate.

8. The multi-axis vibration fixture of claim 7 further comprising a shaker to which said head expander plate is secured.

9. The multi-axis vibration fixture of claim 1 further comprising a slip table and a plate wherein a first side surface of said plate rests upon an upper surface of said slip table, and wherein the vibrating surface to which said base surface is coupled is a second side surface of said plate that is parallel to the first side surface thereof.

10. The multi-axis vibration fixture of claim 9 further comprising a shaker that is coupled to said plate resting upon said slip table.

11. The multi-axis vibration fixture of claim 1 wherein the multi-axis vibration fixture is monolithic.

12. The multi-axis vibration fixture of claim 1 further comprising a resilient mounting disposed between the vibrating surface and the device to be vibrated, whereby the device, in addition to shaking along three mutually orthogonal axes, simultaneously rotates about the three mutually orthogonal axes.

13. A method for environmentally screening a device by shaking the device simultaneously along three mutually orthogonal axes comprising the steps of:

securing to a vibrating surface, that when energized shakes along a pre-established vibration axis, a multi-axis, skewed vibration fixture having a base surface adapted to be juxtaposed with and coupled to the vibrating surface so shaking of the vibrating surface shakes the multi-axis vibration fixture, the multi-axis vibration fixture also having a single planar device mounting surface that is rigidly coupled to said base surface so shaking of said base surface is coupled to said device mounting surface, said planar device mounting surface being disposed to established a fixed, skewed angular relationship with both said base surface and with the vibration axis, the fixed, skewed angular relationship being arranged to cause decomposition of shaking of said base surface coupled to said single planar device mounting surface into shaking along each of three mutually orthogonal axes of a device secured to said planar device mounting surface with ratios between shaking along pairs of the mutually orthogonal axes being:
  a. pre-established by the fixed, skewed angular relationship between the device mounting surface and the vibration axis; and
  b. unequal;

securing the device to be vibrated to the planar device mounting surface at an invariable, skewed angle with respect to the vibration axis, the skewed angle being pre-established by the fixed, skewed angular relationship between the base surface and the device mounting surface;

energizing the vibrating surface to shake along the pre-established vibration axis whereby uniaxial shaking of the vibrating surface and of the base surface is coupled to the device mounting surface and is decomposed into shaking along each of the three mutually orthogonal axes of the device with ratios between shaking along pairs of the mutually orthogonal axes being:
  a. pre-established by the fixed, skewed angular relationship between the device mounting surface and the vibration axis; and
  b. unequal.

14. The method of claim 13 further comprising the step of disposing a resilient mounting between the vibrating surface and the device to be vibrated, whereby the device, in addition to shaking along three mutually orthogonal axes, simultaneously rotates about the three mutually orthogonal axes.

15. A method for environmentally screening a device by shaking the device simultaneously along three mutually orthogonal axes comprising the steps of:

securing to a vibrating surface, that when energized shakes along a pre-established vibration axis, a multi-axis, skewed vibration fixture having a base surface adapted to be juxtaposed with and coupled to the vibrating surface so shaking of the vibrating surface shakes the multi-axis vibration fixture, the multi-axis vibration fixture also having a single planar device mounting surface that is rigidly coupled to said base surface so shaking of said base surface is coupled to said device mounting surface, said device mounting surface being disposed to established a fixed, skewed angular relationship with both said base surface and with the vibration axis, the base surface and the device mounting surface forming respectively a base and upper surface of a multi-axis vibration fixture having a shape of a truncated pyramid, the fixed, skewed angular relationship being arranged to cause decomposition of shaking of said base surface coupled to said single planar device mounting surface into shaking along each of three mutually orthogonal axes of a device secured to said planar device mounting surface with ratios between shaking along pairs of the mutually orthogonal axes being:
  a. pre-established by the fixed, skewed angular relationship between the device mounting surface and the vibration axis; and
  unequal;

securing the device to be vibrated to the planar device mounting surface at an invariable, skewed angle with respect to the vibration axis, the skewed angle being pre-established by the fixed, skewed angular relationship between the base surface and the device mounting surface;

energizing the vibrating surface to shake along the pre-established vibration axis whereby uniaxial shaking of the vibrating surface and of the base surface is coupled to the device mounting surface and is decomposed into shaking along each of the three mutually orthogonal axes of the device with ratios between shaking along pairs of the mutually orthogonal axes being:
  a. pre-established by the fixed, skewed angular relationship between the device mounting surface and the vibration axis; and
  b. unequal.

16. The method of claim 15 further comprising the step of disposing a resilient mounting between the vibrating surface and the device to be vibrated, whereby the device, in addition to shaking along three mutually orthogonal axes, simultaneously rotates about the three mutually orthogonal axes.

* * * * *